M. G. CASS.
Revolving-Harrow.
No. 1,317. Patented Sept. 10, 1839.
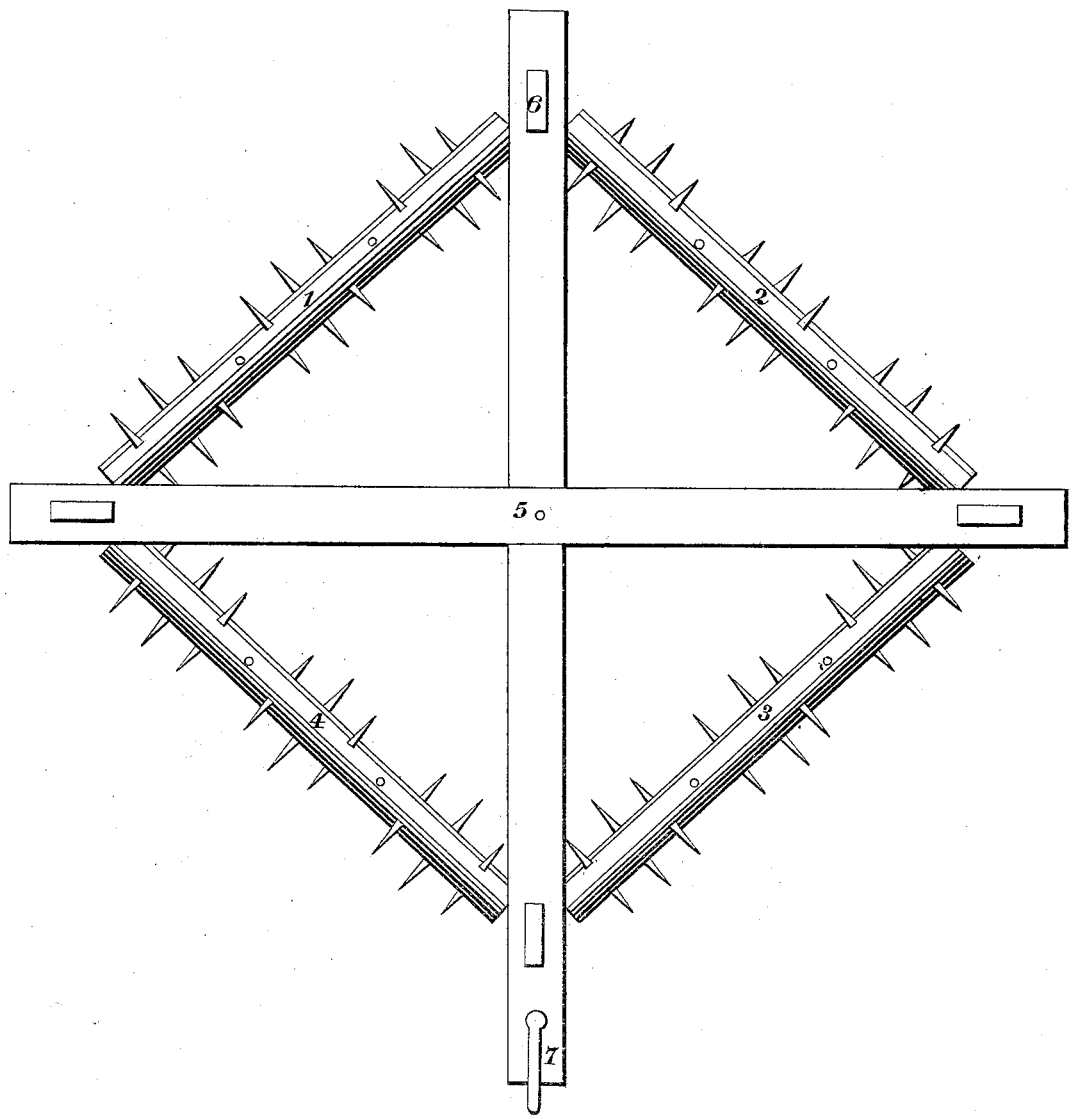

UNITED STATES PATENT OFFICE.

MOSES G. CASS, OF UTICA, NEW YORK.

IMPROVEMENT N REVOLVING HARROWS.

Specification forming part of Letters Patent No. 1,317, dated September 10, 1839.

*To all whom it may concern:*

Be it known that I, MOSES G. CASS, of Utica, Oneida county, State of New York, have invented a new and useful Mode of Constructing a Rolling Harrow; and I do hereby declare that the following is a full and exact description.

The nature of my invention consists in constructing a rolling harrow in that form that by passing over the ground once the purposes of harrowing shall be fully accomplished, and by the addition of a seed-sower and roller of the usual form sowing, harrowing, and rolling the land may be effected by once passing over it.

To enable others skilled in the art to make and use my invention, I will proceed to describe its construction and operation.

I make four bars on cylinders of equal lengths—say four feet—and of equal diameters—say four inches—Plate I, Figs. 1, 2, 3, 4. These may be made of wood or iron. Through these bars I pass iron teeth of sufficient length that one iron shall make two teeth. I arrange them in a spiral from two to four inches distant, making one or more revolutions around the bar or cylinder, as the length may require. The teeth may be made of cast-iron, wrought-iron, or wood. I band the ends of the bars to prevent splitting. I insert gudgeons in the ends of them, with steel points to operate in sockets or boxes fitted to receive them. I take two sticks of timber of convenient size—say four by five inches, six or eight feet in length. Of these I make a frame by helving them into each other in their centers, crossing each other at right angles, fastening together by a bolt, Plate I, Fig. 5. Underneath this frame, near the ends of the four arms, and attached to them by means of mortises and tenons, are bolts and nuts. I let down legs to receive the gudgeons in the above-described bars, Plate I, Fig. 6. The size and form of this frame may be made to conform to the evenness or unevenness of the land. The harrow thus arranged constitutes a four-sided figure, not in a square but in a diamond form, the width exceeding the length.

The power is applied at one corner by means of a clevis attached to one of the short arms, Plate 1, Fig. 7, by which it is drawn forward in a straight line, while the teeth in their revolutions operate in the ground, stirring all parts of it in the most perfect manner, leaving it light and smooth. This harrow, with the addition of a seed-sower and roller, may be drawn with the same strength of team as an ordinary drag-harrow, and thus one-half of the labor usually expended in sowing, harrowing, and rolling saved.

What I claim as my invention, and wish to secure by Letters Patent, is—

The addition of two revolving bars armed with harrow-teeth, placed behind the two already in use, thereby forming a four-sided figure, in the manner herein described.

MOSES G. CASS.

Witnesses:
CHARLES E. DELONG,
A. HUBBELL.